(12) United States Patent
Gilmann et al.

(10) Patent No.: US 9,555,723 B2
(45) Date of Patent: Jan. 31, 2017

(54) VEHICLE SEAT WITH A TURNING DEVICE

(71) Applicant: JOHNSON CONTROLS GMBH, Burscheid (DE)

(72) Inventors: Alexander Gilmann, Mülheim/Ruhr (DE); Andreas Golinski, Dortmund (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 80 days.

(21) Appl. No.: 14/423,812

(22) PCT Filed: Aug. 23, 2013

(86) PCT No.: PCT/EP2013/067510
§ 371 (c)(1),
(2) Date: Feb. 25, 2015

(87) PCT Pub. No.: WO2014/037232
PCT Pub. Date: Mar. 13, 2014

(65) Prior Publication Data
US 2015/0224897 A1   Aug. 13, 2015

(30) Foreign Application Priority Data

Sep. 6, 2012   (DE) .......................... 10 2012 017 772

(51) Int. Cl.
*B60N 2/14*   (2006.01)
(52) U.S. Cl.
CPC ................. *B60N 2/14* (2013.01); *B60N 2/143* (2013.01); *B60N 2205/20* (2013.01)

(58) Field of Classification Search
CPC ........ B60N 2/14; B60N 2/143; B60N 2205/20
USPC .......................... 297/216.1, 344.21, 344.22
See application file for complete search history.

(56) References Cited

U.S. PATENT DOCUMENTS 5,474,353 A * 12/1995 Koester .................. B60N 2/062
296/65.07
5,853,221 A * 12/1998 Thoman ................. B60N 2/143
248/418

FOREIGN PATENT DOCUMENTS

DE   10 2010 044 654 A1   3/2012
DE   10 2010 053 802 B3   5/2012

\* cited by examiner

*Primary Examiner* — Milton Nelson, Jr.
(74) *Attorney, Agent, or Firm* — McGlew and Tuttle, P.C.

(57) ABSTRACT

A vehicle seat (1) has a turning device (10), including a base part (14), a seat part support (16) rotatable relative to the base part about an axis of rotation (12) and at least one catching device (20), preventing the seat part support (16) from being ripped out of the base part (14) in the event of a crash, including an insertion element (24) and a receiving element (26) into which the insertion element (24) can be inserted. The receiving element (26) has at least one spring element (40) which undergoes a deformation by contact with the inserted insertion element (24). The spring element (40) is designed such that, when the insertion element (24) is inserted, a spring resistance is approximately the same as when the insertion element (24) is not inserted. The spring resistance of the spring element increases upon a further deformation by the insertion element (24).

10 Claims, 3 Drawing Sheets

VEHICLE SEAT WITH A TURNING DEVICE

CROSS REFERENCE TO RELATED APPLICATIONS

This application is a United States National Phase Application of International Application PCT/EP2013/067510 filed Aug. 23, 2013 and claims the benefit of priority under 35 U.S.C. §119 of German Patent Application DE 10 2012 017 772.0 filed Sep. 6, 2012, the entire contents of which are incorporated herein by reference.

FIELD OF THE INVENTION

The invention relates to a vehicle seat with a turning device with a base component and a seat part carrier, which is rotatable relative to the base part about an axis of rotation, and at least one catching unit in order to prevent the seat part carrier from being torn apart from the base component in the event of a crash.

BACKGROUND OF THE INVENTION

DE 10 2010 053 802 B3 discloses a vehicle seat of generic type with a turning device which comprises a fixed base component and a seat part carrier, which is rotatable relative to the base part about a perpendicular axis of rotation. Here, the fixed base component is fixed to a vehicle structure, and a seat part of the vehicle seat can be fixed to the seat part carrier.

For locking the base component to the seat part carrier, the turning device has a locking device, which comprises a locking plate and a pivotal locking lever.

As a crash safeguard two catch bolts, which have a mushroom-shaped widening, are arranged on the base component in the rear end area, viewed in the direction of travel. The seat part carrier has two openings, through which the catch bolts extend when the turning device is in the basic position. The catch bolts prevent the seat part carrier being torn apart from the base component in the event of a crash.

The catch bolts are each enclosed by an elastic sleeve, on which the openings of the seat part carrier rest in the basic position. The elastic sleeves eliminate any play between the base component and the seat part carrier, reduce any noises occurring and increase the natural frequency of the vehicle seat.

SUMMARY OF THE INVENTION

An object of the invention is to specify an alternative to a vehicle seat with a turning device of the aforementioned type.

A vehicle seat of generic type with a turning device comprises a base component and a seat part carrier, which is rotatable relative to the base part about an axis of rotation, and at least one catching unit to prevent the seat part carrier being torn apart from the base component in the event of a crash.

According to the invention the catching unit comprises an insertion element and a receiving element, into which the insertion element can be inserted, and the receiving element comprises at least one spring element, which undergoes a deformation through contact with the inserted insertion element, wherein the spring element is designed in such a way that when the insertion element is inserted the spring rigidity of the spring element is approximately the same as when the insertion element is not inserted, and the spring rigidity of the spring element increases upon a further deformation by the insertion element.

Since at least one catching unit, which comprises an insertion element and a receiving element, into which the insertion element can be inserted, is provided in order to prevent the seat part carrier being torn apart from the base component in the event of a crash, and the receiving element comprises at least one spring element, which undergoes a deformation through contact with the inserted insertion element, wherein the spring element is designed in such a way that when the insertion element is inserted the spring rigidity of the spring element is approximately the same as when the insertion element is not inserted, and the spring rigidity of the spring element increases upon a further deformation by the insertion element, any play between the base component and the seat part carrier is reduced, any noises occurring are reduced and the natural frequency of the vehicle seat is increased.

Here the spring force of the spring element acting in opposition to the insertion element when it is inserted into the receiving element is only relatively small, so that a movement of the insertion element through the receiving element is also not substantially impeded. In the event of an ensuing movement of the inserted insertion element in a vertical direction relative to the receiving element, caused in particular by an oscillation, however, the spring element is further deformed and its spring rigidity is thereby increased. As a result, the spring force applied by the spring element is increased significantly.

The spring rigidity of the spring element is therefore approximately constant under a relatively minor deformation and increases relatively sharply under greater deformation. Under relatively minor deformation, therefore, the spring force of the spring element is proportional to the deformation. Under greater deformation the spring force increases relatively sharply in a non-linear manner.

The spring element advantageously comprises a central bending area in the form of a circular segment of approximately constant radius, wherein an arm area, which runs approximately straight when the insertion element is not inserted, adjoins the bending area on each side. Advantageously adjoining each arm area here is a hook area, which serves for fixing the spring element to the receiving element and which is designed with a U-shaped cross section.

The receiving element preferably has a U-shaped cross section with an upper arm, a lower arm and a base arm, wherein one spring element each is provided on the upper arm and on the lower arm. Here, the hook areas each bear with a bearing portion on the respective arm.

The spring elements are preferably situated largely in a space which is enclosed by the upper arm, the base arm and the lower arm.

Here the bending areas of the spring elements face one another and accommodate the inserted insertion element between them. The bending areas of the spring elements are then forced apart by the inserted insertion element and onto the arms.

According to one advantageous development of the invention the arm areas run away from the arm at an angle of 10° to 20°, preferably 15°, when the insertion element is not inserted.

The invention is explained in more detail below with reference to advantageous exemplary embodiments represented in the drawings. However, the invention is not limited to these exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
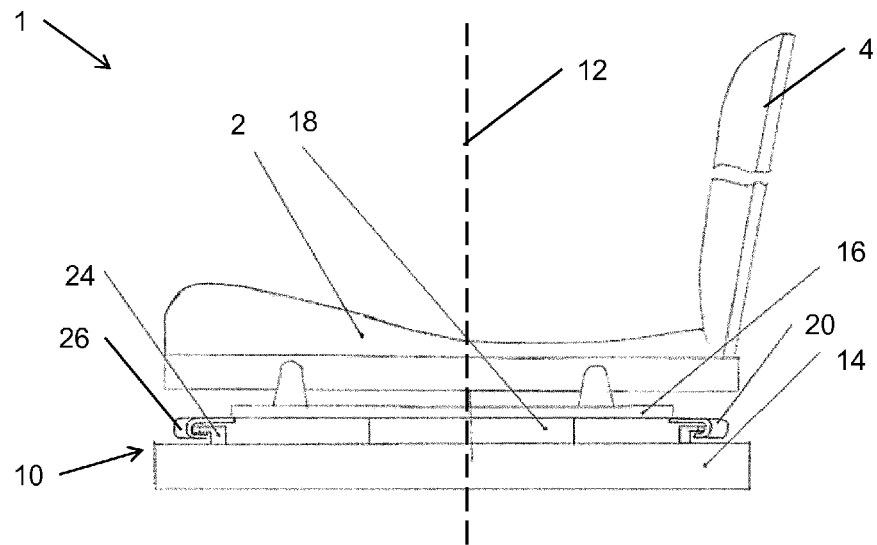
FIG. 1 is a schematic side view of a vehicle seat.
Figure 2:
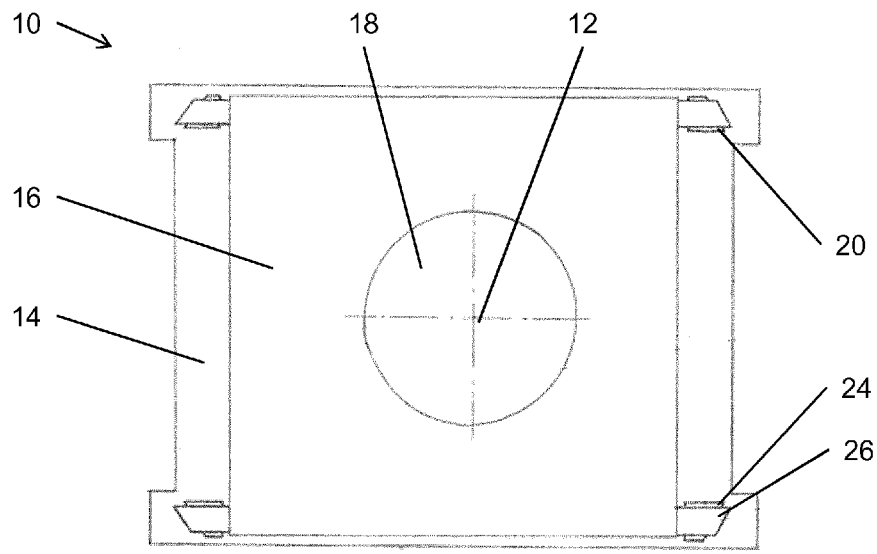
FIG. 2 is a top view of a turning device in a vertical direction.
Figure 3:
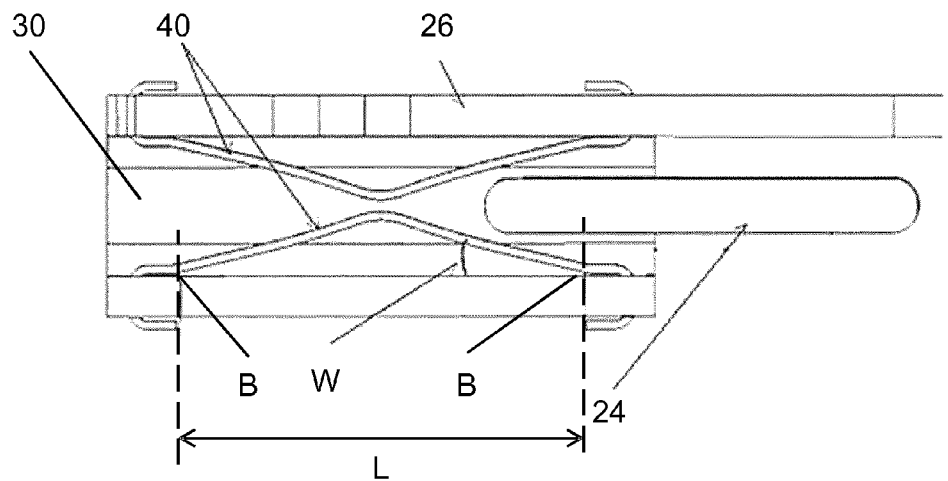
FIG. 3 is a perpendicular sectional view through a catching unit.
Figure 4:
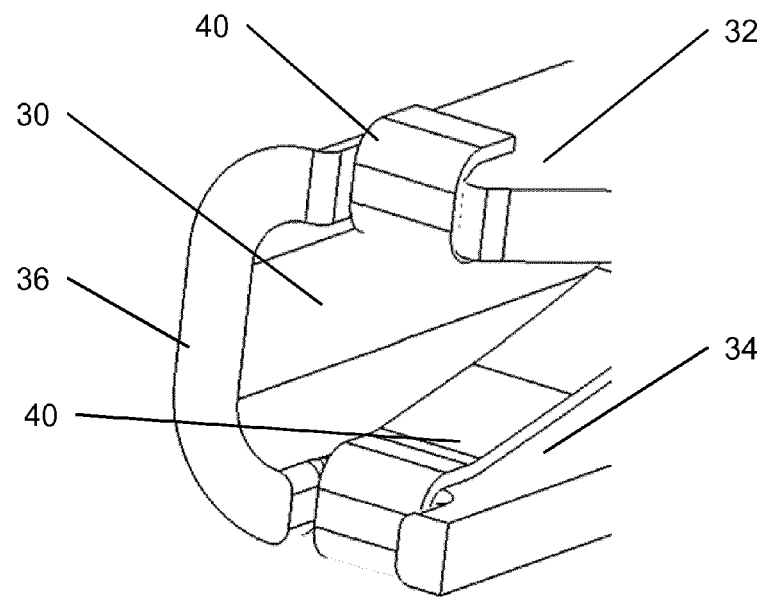
FIG. 4 is a perspective view of a receiving element of a catching unit.

The vehicle seat 1 for a motor vehicle has a seat part 2, which comprises a seat frame and a rake-adjustable backrest 4 attached thereto.

The arrangement of the vehicle seat 1 inside the vehicle and its usual direction of travel define the directional specifications used below. Here, a direction oriented perpendicular to the ground is referred to hereinafter as the vertical direction and a direction perpendicular to the vertical direction and perpendicular to the direction of travel is referred to hereinafter as the transverse direction.

A manually operated backrest adjustment fitting (not shown) serves to adjust the rake of the backrest 4, which means that the angle between the seat part 2 and the backrest 4 is adjustable. Alternatively, an electrical drive is also feasible.

A headrest (not shown) is also attached to the vertically upper end of the backrest 4, which is remote from the seat part 2.

The vehicle seat 1 is longitudinally adjustable by means of a longitudinal adjuster (not shown), which comprises two lower rails connected to the vehicle floor of the motor vehicle and two upper rails connected to the vehicle seat 1. This means that the seat part 2 together with the backrest 4 is adjustable in a longitudinal direction, which corresponds approximately to the direction of travel. For this purpose, each of the upper rails is displaceably guided in one of the lower rails running parallel in a longitudinal direction. Each of the two upper rails forms a seat rail pair with the respectively associated lower rail. The longitudinal adjuster therefore comprises two seat rail pairs running parallel.

A locking device (not shown) serves for locking each of the two upper rails to the respective lower rail. The locking device comprises a release bar which serves for releasing the locking device. Alternatively, an electrical drive is also feasible here too.

The seat part 2 comprises a seat cushion in the form of a foam part. The backrest 4 is also upholstered with a backrest cushion in the form of a foam part. The seat cushion and the backrest cushion are each covered by a covering. The seat cushion and the backrest cushion substantially increase the seating comfort for an occupant of the vehicle seat 1.

The seat part 2 together with the backrest 4 can be turned about an axis of rotation 12, running substantially in a vertical direction, by means of a turning device 10. The turning device 10 comprises a fixed base component 14 and a seat part carrier 16, which is rotatable in relation to the former about an axis of rotation 12 and to which the seat part 2 is fixed. In this case the seat part carrier 16 is rotatable relative to the base component 14 by an angle of 180°. Here the base component 14 is fixed to the upper rails of the longitudinal adjuster. Alternatively the base component may also be fixed directly to the vehicle structure.

A pivot bearing 18 is furthermore provided, which allows the seat part carrier 16 to rotate relative to the base component 14. A locking device (not shown) serves to fix the seat part carrier 16 relative to the base component 14, so as to prevent a rotation of the seat part carrier 16 relative to the base component 14. A pivot bearing of generic type with a locking device is disclosed, for example, by DE 102010053802 B3, the content of which disclosure relating thereto is expressly incorporated.

The locking device for the pivot bearing 18 here comprises a double-armed locking lever (not shown), which is supported on the seat part carrier 16 about a swivel axis running parallel to the axis of rotation 12. The locking device further comprises a locking plate (not shown), which is arranged concentrically about the axis of rotation 12 on the base component 14.

A projection, which engages in a slot provided in the locking plate in order to fix the seat part carrier 16 to the base component 14, is attached to the first arm of the locking lever. A locking spring (not shown) impinges on the locking lever in such a way that the projection is pressed into the slot.

The projection is moved out of the slot through manual actuation of the free end of the second arm of the locking lever in opposition to the force of the locking spring The fixing of the seat part carrier 16 to the base component 14 is thereby released and the seat part carrier 16 can be rotated relative to the base component 14 about the axis of rotation 12.

Other devices for fixing the seat part carrier 16 to the base component 14 are also feasible as an alternative to the locking device described.

In order to prevent the seat part carrier 16 being torn apart from the base component 14, especially in the event of a crash, four catching units 20 are provided here.

Of these, two catching units 20 are arranged in the front end area of the turning device 10, viewed in the direction of travel, and two in the rear area of the turning device 10, viewed in the direction of travel. Here, in each case one of the catching units 20 is fitted in a left-hand outer area, viewed in a transverse direction, and the other of the catching units 20 in a right-hand outer area of the turning device, viewed in a transverse direction. Alternatively another number of catching units 20 may also be provided, and the catching units 20 provided may also be arranged at different points.

Each catching unit 20 comprises a fixed insertion element 24, which is fixed to the base component 14. Each catching unit 20 furthermore comprises a receiving element 26, which is fixed to the seat part carrier 16 and which also rotates when the seat part carrier 16 is turned relative to the base component 14 about the axis of rotation 12. It is also feasible for the insertion element 24 to be fixed to the seat part carrier 16 and the receiving element 26 to be fixed to the base component 14.

The—in this case four—catching units 20 are of substantially similar construction, for which reason only one catching unit 20 will be examined.

In a basic position of the vehicle seat 1 oriented in the direction of travel, in which an occupant of the vehicle seat 1 is therefore looking in the direction of travel, the insertion element 24 is fully inserted into the receiving element 26.

The insertion element 24 has a fixing area, which is fixed to the base component 14. Here the fixing area is approximately cylindrical and is fixed to the base component by means of a screwed connection. Other design forms of the fixing area and other types of fixing, in particular welding, are also feasible.

The insertion element 24 furthermore has an insertion area, which in this case is integrally formed with the fixing area. Alternatively the fixing area and the insertion area may also be formed in two parts and connected to one another. The insertion area is substantially formed as a flat plate, which extends in a plane perpendicular to the vertical direction.

The insertion element 26 has a basic body 30, which is of U-shaped cross section and comprises an upper arm 32, a lower arm 34 and a base arm 36. The upper arm 32 and the lower arm 34 here run parallel to one another and parallel to the insertion area of the insertion element 24 in a plane perpendicular to the vertical direction. The base arm 36 runs perpendicular to this plane and connects the upper arm 32 to the lower arm 34.

Here the upper arm 32 is fixed, in this case screwed, to the seat part carrier 16. It is also feasible to attach the upper arm 32 of the basic body 30 of the receiving element 26 to the seat part carrier 16 in some other way, for example by welding. It is equally feasible to fix the lower arm 34 and/or the base arm 36 of the basic body 30 of the receiving element 26 to the seat part carrier 16.

The receiving element 26 further comprises two spring elements 40, which are designed in the manner of a leaf spring. Here, one spring element 40 is arranged on the upper arm 32 of the basic body 30 and one on the lower arm 34 of the basic body 30. The spring elements 40 here are arranged in such a way that they are largely situated in a space which is enclosed by the upper arm 32, the base arm 36 and the lower arm 34.

The two spring elements 40 here are of substantially similar construction, for which reason only the spring element 40 which is arranged on the lower arm 32 will be examined. It is also feasible to provide various spring elements 40. In particular a first spring element 40 may be designed according to the first exemplary embodiment described below whilst the other spring element 40 is designed according to the second exemplary embodiment described thereafter.

Figure 5:
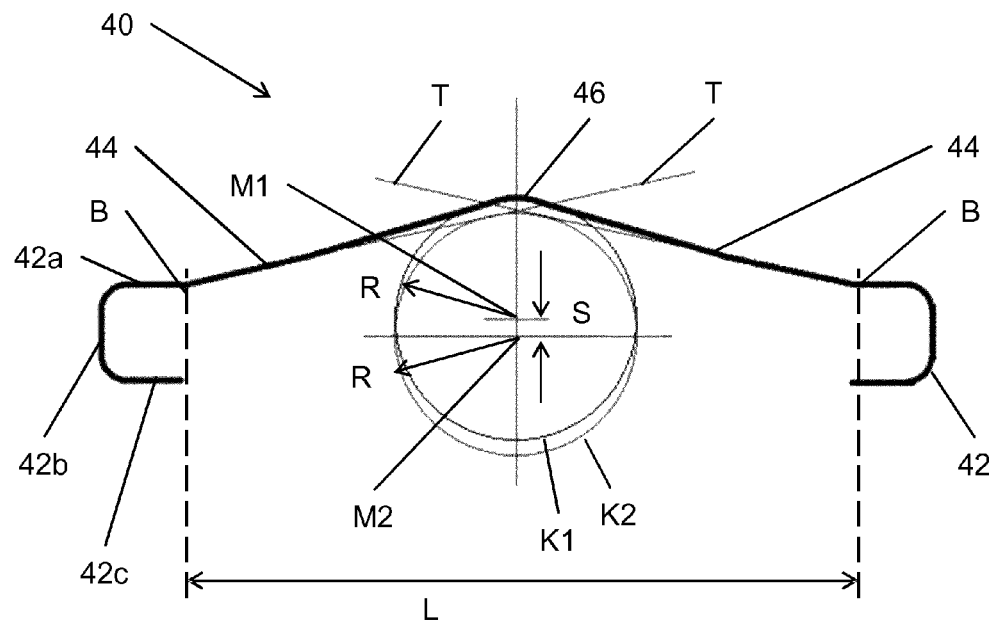
FIG. 5 is a view of a leaf spring of a catching unit according to a first exemplary embodiment.

The spring element 40 according to the first exemplary embodiment, which is represented in FIG. 5, is of elongated design and has a hook area 42 at each end. Each hook area 42 is produced through double bending of the respective end of the spring element 40 and is of U-shaped cross section.

Adjoining each hook area 42 is an arm area 44, which runs in an approximately straight line or linearly. The two arm areas 44 at the same time run slanting towards one another. A bending area 46 is provided centrally between the two arm areas 44. At the center the bending area 46 has approximately the shape of a circular segment of constant radius.

Each hook area 42 here comprises a bearing portion 42a, which adjoins one of the arm areas 44 and runs approximately perpendicular to the vertical direction, that is to say approximately horizontally. The bearing portion 42a here bears flatly on the lower arm 34. Adjoining the bearing portion 42a is a feed-through portion 42b, which runs in a vertical direction and extends through an opening provided in the lower arm 32. Adjoining the feed-through portion 42b is a retaining portion 42c, which runs parallel to the bearing portion 42a and thereby approximately perpendicular to the vertical direction. The bearing portion 42a and the retaining portion 42c therefore partially enclose the lower arm 34 of the basic body 30.

In the unloaded state, which is represented in FIG. 3, FIG. 4, FIG. 5 and FIG. 6, the insertion element 24 is not inserted into the receiving element 26 and is therefore separated by a distance from the spring elements 40. The spring elements 40 are therefore not under load.

In this state the arm areas 44, starting at the bearing portion 42a of the adjoining hook area 42, run away from the lower arm 34 at an angle W to the horizontal. The angle W is relatively small, here approximately 15°, the angle W preferably lying in a range between 10° and 20°. The two contact points B, at which the arm areas 44 leave the arm 34, are separated by a distance L from one another.

Centrally the bending area 46 lying between the two arm areas 44 is designed in the shape of a circular segment of a first circle K1 and has a radius R and a first center M1. The bending area 46 thereafter runs out approximately in a straight line to both sides of the central area and up to the arm areas 44.

Figure 6:
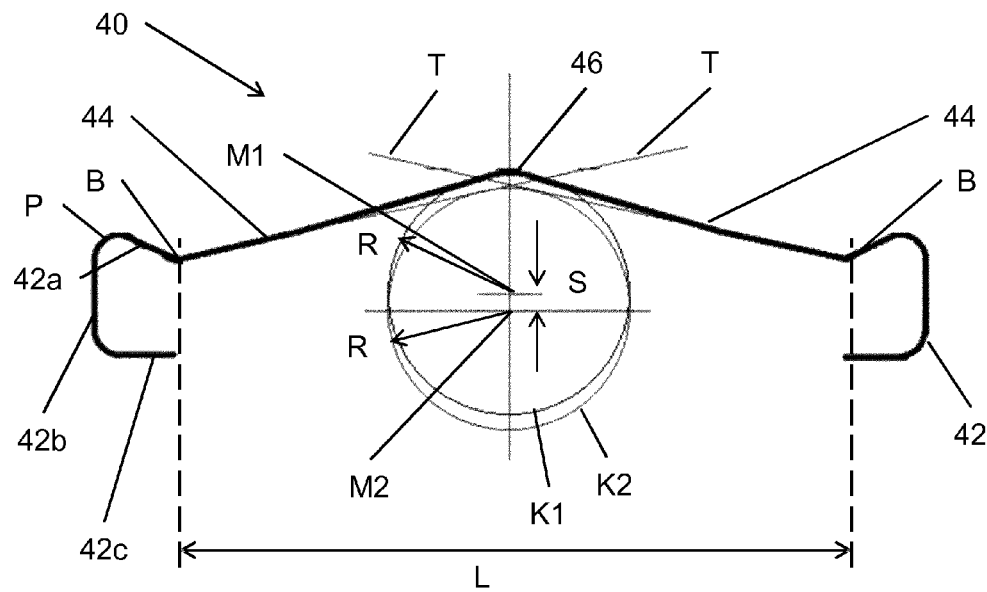
FIG. 6 is a view of a leaf spring of a catching unit according to a second exemplary embodiment.

In FIG. 5 and FIG. 6 tangents T to the arm areas 44 are drawn in, which run through the contact points B. The tangents T are set tangentially to a second circle K2. The second circle K2 has a second center M2 and the same radius R as the first circle K1. The second center M2 is offset by the distance S in a vertical direction relative to the first center M1.

The rigidity of the spring element 40 varies as a function of the distance L between the contact points B. Here the spring rigidity increases as the distance L diminishes.

The spring rigidity of the spring element 40 is approximately constant under a relatively small deformation and increases relatively sharply under a greater deformation. Under a relatively small deformation, therefore, the spring force of the spring element 40 is approximately proportional to the deformation. Under a greater deformation the spring force increases relatively sharply in a non-linear manner.

When the insertion element 24 is inserted into the receiving element 26 the distance L between the contact points B is at a maximum and the spring rigidity of the spring element 40 is thereby minimal. At the start of the insertion process, the spring element 40 therefore offers a relatively small spring force by way of resistance. As the insertion process proceeds the bending area 46 is pressed by the receiving element 24 in the direction of the lower arm 34. The distance L thereby diminishes slightly, whereupon the spring rigidity of the spring element 40 increases slightly. The opposing spring force offered by the spring element 40 thereby increases in an approximately linear manner.

When the insertion element 24 is fully inserted into the receiving element 26, the distance L between the contact points B is reduced compared to the unloaded state and the spring force of the spring element 40 is thereby increased. In this state the spring element 40 compensates optimally for oscillations occurring in a vertical direction between the base component 14 and the seat part carrier 16 of the turning device 10. The spring rigidity of the spring element 40 is still relatively low here. The spring element 40 therefore exerts only a relatively small friction force on the insertion element 24. As a result, the insertion element 24 is able to move relatively easily through the receiving element 26 when the turning device 10 is rotated through 180°. Such a movement of the insertion element 24 through a receiving element 26 is therefore impeded only to an unsubstantial degree by the spring elements 40.

The change in the distance L between the contact points B in proportion to the deflection of the bending area 46 in the direction of the lower arm 34 also varies directly as a function of the distance S between the first center M1 of the first circle K1 and the second center M2 of the second circle K2 of the bending area 46. Here, a greater distance S corresponds to a greater change in the distance L and hence to a steeper increase in the spring rigidity of the spring element 40 L and therefore a steeper increase in the spring force of the spring element 40.

At the occurrence of oscillations in a vertical direction, the insertion element 24 in a vertical direction presses alternately on one of the contiguous spring elements 40 and therefore presses this on to the lower arm 34 or the upper arm 32. In so doing, the distance L between the contact points B of the spring element 40 is reduced further and relatively sharply, and the spring rigidity of the spring element 40 is thereby significantly increased. The spring force of the spring element 40 is thereby significantly increased and oscillations occurring are substantially damped.

The two spring elements 40 here are arranged in the receiving element 26 in such a way that the distance between the bending areas 46 in a vertical direction is less than the thickness of the insertion element 24. Here, the thickness of the insertion element 24 is the extent thereof in a vertical direction. This ensures that after insertion into the receiving element 26 the insertion element 24 is always in contact with both spring elements 40, even when the position of the insertion element 24 in a vertical direction deviates from the central position due to tolerances.

The spring element 40 according to the second exemplary embodiment, which is represented in FIG. 6, is largely similar in structure and effect to the spring element 40 according to the first exemplary embodiment, which is represented in FIG. 5. The differences between the second exemplary embodiment and the first exemplary embodiment are explained below.

The hook area 42 of the spring element 40 according to the second exemplary embodiment has a shape deviating slightly from the U-shape.

Here the bearing portion 42*a* adjoining one of the arm areas 44 does not run perpendicular to the vertical direction but obliquely thereto. Instead of bearing completely flat on the lower arm 34, therefore, the bearing portion 42*a* bears only partially thereon and then runs inclined in relation to this.

The point on the bearing portion 42*a* at which the bearing portion 42*a* of the hook area 42 merges into the arm area 44 bears on the lower arm 34. A transition point P, at which the bearing portion 42*a* merges into the feed-through portion 42*b* of the hook area 42, is situated at a distance from the lower arm 34 in a vertical direction.

This design according to the second exemplary embodiment serves to increase the spring rigidity of the spring element 40 compared to the design according to the first exemplary embodiment. Furthermore, the transition points P, at which the bearing portions 42*a* merge into the feed-through portions 42*b* of the hook areas 42 form additional supports for the insertion element 24 in the event of heavy oscillations in a vertical direction.

The distance of the transition point P, at which the bearing portion 42*a* merges into the feed-through portion 42*b* of the hook area 42, from the lower arm 34 in a vertical direction is designed so that the insertion element 24 can be fed through between said transition point P of the spring element 40 on the lower arm 34 and said transition point P of the spring element 40 on the upper arm 32. This means that the distance of said transition points P of the spring element 40 on the lower arm 34 and of the spring element 40 on the upper arm 32 is greater than the extent of the insertion element 24 in a vertical direction.

The features disclosed in the preceding description, in the claims and in the drawings may be significant for the realization of the invention in its various embodiments both individually and also in combination.

While specific embodiments of the invention have been shown and described in detail to illustrate the application of the principles of the invention, it will be understood that the invention may be embodied otherwise without departing from such principles.

The invention claimed is:

1. A vehicle seat comprising a turning device comprising:
a base component;
a seat part carrier, which is rotatable relative to the base component about an axis of rotation; and
at least one catching unit to prevent the seat part carrier from being torn apart from the base component in an event of a crash, wherein the at least one catching unit comprises an insertion element and a receiving element, into which the insertion element can be inserted, and the receiving element comprises at least one spring element, which undergoes a deformation through contact with the inserted insertion element, wherein the spring element has a spring rigidity that is approximately the same when the insertion element is inserted and when the insertion element is not inserted, and the spring rigidity of the spring element increases upon a further deformation by the insertion element.

2. The vehicle seat as claimed in claim 1, wherein the spring element comprises a central bending area in a form of a circular segment of approximately constant radius.

3. The vehicle seat as claimed in claim 2, wherein an arm area, which approximately extends in a straight line, when the insertion element is not inserted, adjoins the bending area on each side.

4. The vehicle seat as claimed in claim 3, wherein a hook area, which serves for fixing the spring element to the receiving element and which is designed with a U-shaped cross section, adjoins each arm area.

5. The vehicle seat as claimed in claim 4, wherein the receiving element has a U-shaped cross section with an upper arm, a lower arm and a base arm, wherein one spring element each is provided on the upper arm and on the lower arm.

6. The vehicle seat as claimed in claim 5, wherein the hook areas each bear, with a bearing portion, on the respective arm.

7. The vehicle seat as claimed in claim 5, wherein the spring elements are situated largely in a space which is enclosed by the upper arm, the base arm and the lower arm.

8. The vehicle seat as claimed in claim 5, wherein the bending areas of the spring elements face one another and accommodate the inserted insertion element between them.

9. The vehicle seat as claimed in claim 5, wherein the bending areas of the spring elements are forced apart by the inserted insertion element and onto the arms.

10. The vehicle seat as claimed in claim 5, wherein the arm areas extend away from the arm at an angle of 10° to 20° when the insertion element is not inserted.

\* \* \* \* \*